United States Patent
Kim et al.

(10) Patent No.: US 12,456,292 B2
(45) Date of Patent: Oct. 28, 2025

(54) APPARATUS AND METHOD FOR DETECTING PERFORMANCE DEGRADATION OF AN AUTONOMOUS VEHICLE

(71) Applicants: HYUNDAI MOTOR COMPANY, Seoul (KR); KIA CORPORATION, Seoul (KR)

(72) Inventors: Jin Sol Kim, Hwaseong-si (KR); Se Jeong Lee, Suwon-si (KR); Jung Woo Heo, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 382 days.

(21) Appl. No.: 18/098,599

(22) Filed: Jan. 18, 2023

(65) Prior Publication Data
US 2024/0071065 A1  Feb. 29, 2024

(30) Foreign Application Priority Data

Aug. 26, 2022 (KR) .................. 10-2022-0107756

(51) Int. Cl.
*G06V 10/82* (2022.01)
*G06V 10/75* (2022.01)

(52) U.S. Cl.
CPC ............ *G06V 10/82* (2022.01); *G06V 10/758* (2022.01)

(58) Field of Classification Search
None
See application file for complete search history.

(56) References Cited

U.S. PATENT DOCUMENTS

| 10,824,151 | B2 | 11/2020 | Kim et al. |
| 2019/0371087 | A1 | 12/2019 | Shin et al. |
| 2020/0249675 | A1 | 8/2020 | Kim et al. |
| 2020/0364456 | A1* | 11/2020 | Tran ...................... G06T 7/0004 |
| 2021/0117760 | A1* | 4/2021 | Krishnan ................. G06N 3/08 |

(Continued)

FOREIGN PATENT DOCUMENTS

| CN | 107577994 A | 1/2018 |
| CN | 112396027 A | 2/2021 |

(Continued)

OTHER PUBLICATIONS

Mubariz Zaffar, "Visual Place Recognition for Autonomous Robots," School of Computer Science and Electronic Engineering, University of Essex, Master by Dissertation, Oct. 2020 (Year: 2020).*

(Continued)

*Primary Examiner* — Soo Shin
(74) *Attorney, Agent, or Firm* — Lempia Summerfield Katz LLC (57) ABSTRACT

An apparatus and method for detecting performance degradation of an autonomous vehicle include a storage configured to store a deep learning model used for image recognition in the autonomous vehicle and a controller configured to determine entropy of each pixel among a plurality of pixels in an output image of the deep learning model, determine an average value of the entropy of the plurality of pixels, and detect performance degradation of the deep learning model based on the average value of the entropy of the plurality of pixels.

14 Claims, 8 Drawing Sheets

(56) References Cited

U.S. PATENT DOCUMENTS

2021/0271259 A1   9/2021  Karpathy
2021/0279950 A1*  9/2021  Phalak .................... G06T 7/55
2022/0092366 A1*  3/2022  Chiu ..................... G06N 20/00

FOREIGN PATENT DOCUMENTS

| CN | 112509334   A  | 3/2021 |
| KR | 20190075017 A  | 6/2019 |
| KR | 20200095381 A  | 8/2020 |
| KR | 102260246   B1 | 6/2021 |

OTHER PUBLICATIONS

He et al., "Deep learning for strong lensing search: tests of the convolutional neural networks and new candidates from KiDS DR3," MNRAS 497, 556-571 (2020) (Year: 2020).*

* cited by examiner

APPARATUS AND METHOD FOR DETECTING PERFORMANCE DEGRADATION OF AN AUTONOMOUS VEHICLE

CROSS-REFERENCE TO RELATED APPLICATION

This application claims the benefit of and priority to Korean Patent Application No. 10-2022-0107756, filed in the Korean Intellectual Property Office on Aug. 26, 2022, the entire contents of which are incorporated herein by reference.

TECHNICAL FIELD

The present disclosure relates to a technology for detecting performance degradation of a deep learning model used for image recognition (e.g., object recognition in an image) in an autonomous vehicle.

BACKGROUND

An artificial neural network (ANN) in the field of artificial intelligence is an algorithm for allowing a machine to learn by simulating a human neural structure. Recently, artificial neural networks have been applied to image recognition, speech recognition, natural language processing, and the like, and has shown excellent results. A typical artificial neural network includes an input layer that receives an input, a hidden layer that actually learns, and an output layer that returns the result of an operation. An artificial neural network that includes a plurality of hidden layers is called a deep neural network (DNN). The deep neural network may include a convolutional neural network (CNN), a recurrent neural network (RNN), and the like. A particular type of deep neural network may be utilized depending on the structure, problem to be solved, purpose, and the like.

An artificial neural network allows a computer to learn by itself based on data. When trying to solve a problem using an artificial neural network, a suitable artificial neural network model and data to be analyzed typically need to be prepared. An artificial neural network model to solve a problem is typically trained based on data. Before training the model, it is generally necessary to first divide the data into two types: a train dataset and a validation dataset. The train dataset is used to train the model and the validation dataset is used to verify the performance of the model.

There are various reasons for validating an artificial neural network model. For example, an artificial neural network developer may tune a model by modifying the hyper parameters of the model based on the verification result of the model. As another example, model verification may be performed to select a suitable model from various models. Several reasons why model verification may be necessary are explained in more detail as follows.

The model verification may be used may be used to predict accuracy. Generally, the purpose of artificial neural networks is to achieve good performance on out-of-sample data not used for training. Therefore, after creating the model, it is essential to check how well the model will perform on out-of-sample data. Because the model should not be verified using the train dataset, the accuracy of the model should be measured using the validation dataset separate from the train dataset.

The model verification may also be used to increase the performance of the model by tuning the model. For example, it is possible to prevent overfitting. Overfitting means that the model is over-trained on the train dataset. When the training accuracy is high but the validation accuracy is low, the occurrence of overfitting may be suspected. In addition, overfitting may be understood in more detail through training loss and validation loss. When overfitting occurs, overfitting may be prevented to increase the validation accuracy. It is possible to prevent overfitting by using a scheme such as regularization or dropout.

The deep learning model on which the learning process and verification process have been completed may be applied to various systems and utilized for various purposes. For example, the deep learning model may be utilized for image recognition in autonomous vehicles. The performance of the deep learning model used for image recognition in autonomous vehicles is directly related to the safety of passengers, so it may be necessary or desired to detect the performance degradation of the deep learning model from time to time and take immediate action when the performance degradation occurs.

A conventional technique for detecting performance degradation of a deep learning model includes setting specific conditions one by one, collecting an error code when the specific condition is satisfied, and detecting the performance degradation of the deep learning model based on the error code.

In such a conventional technique, it generally takes a lot of time to set the specific condition. Further, Under a condition (undefined condition) not included in the specific condition, the performance degradation of the deep learning model may not be detected.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while maintaining the above-mentioned advantages achieved by the prior art.

An aspect of the present disclosure provides an apparatus and a method for detecting performance degradation of an autonomous vehicle. The disclosed apparatus and method are capable of quickly and accurately detecting the performance degradation of an autonomous vehicle without the need to individually set specific conditions for detecting the performance degradation of a deep learning model. In an aspect, the disclosed apparatus and method detect performance degradation of an autonomous vehicle by determining entropy of each pixel among a plurality of pixels in an output image of a deep learning model used for image recognition in the autonomous vehicle, determining an average value of the entropy of plurality of pixels, and detecting performance degradation of the deep learning model based on the average value of the entropy of the plurality of pixels.

Another aspect of the present disclosure provides an apparatus and method for detecting performance degradation of an autonomous vehicle capable of confirming the location and time at which the performance degradation of a deep learning model has occurred by collecting monitoring information corresponding to a camera image input to the deep learning model and transmitting the collected monitoring information to a data server. In aspects, the deep learning model may be further trained based on learning data obtained at the location at the time, thereby improving the performance of the deep learning model.

The technical problems to be solved by the present disclosure are not limited to the aforementioned problems, and any other technical problems not mentioned herein may be clearly understood from the following description by those having ordinary skill in the art to which the present disclosure pertains. Also, it may be easily understood that the objects and advantages of the present disclosure may be realized by the units and combinations thereof recited in the claims.

According to an aspect of the present disclosure, an apparatus for detecting performance degradation of an autonomous vehicle includes a storage that stores a deep learning model used for image recognition in the autonomous vehicle and includes a controller. The controller is configured to determine entropy of each pixel in an output image of the deep learning model, determine an average value of the entropy of each pixel, and detect performance degradation of the deep learning model based on the average value of the entropy of each pixel.

According to an embodiment, the controller may be configured to detect the performance degradation of the deep learning model when the average value of the entropy of the plurality of pixels is within a reference range.

According to an embodiment, the controller may be configured to, when the performance degradation of the deep learning model is detected, collect monitoring information corresponding to a camera image input to the deep learning model and transmit the collected monitoring information to a data server.

According to an embodiment, the monitoring information may include at least one of vehicle model information, time information, latitude information, longitude information, deep learning model type information, deep learning model version information, event camera information, auto light status information, rain sensor status information, or road type, or a combination thereof.

According to an embodiment, the data server may be configured to transmit, to a deep learning model management server, a location and a time at which the performance degradation of the deep learning model has occurred according to the monitoring information.

According to an embodiment, the deep learning model management server may be configured to collect learning data from probe vehicles traveling at the location at the time, train a deep learning model managed by the deep learning model management server based on the learning data, and update the deep learning model provided in the autonomous vehicle by using the learned deep learning model.

According to another aspect of the present disclosure, a method of detecting performance degradation of an autonomous vehicle includes: determining, by a controller, entropy of each pixel among a plurality of pixels in an output image of a deep learning model for image recognition in the autonomous vehicle, wherein the deep learning model is stored in a storage; determining, by the controller, an average value of the entropy of the plurality of pixels; and detecting, by the controller, performance degradation of the deep learning model based on the average value of the entropy of the plurality of pixels.

According to an embodiment, detecting of the performance degradation of the deep learning model may include detecting the performance degradation of the deep learning model when the average value of the entropy of the plurality of pixels is within a reference range.

According to an embodiment, the method may further include, when the performance degradation of the deep learning model is detected, collecting monitoring information corresponding to a camera image input to the deep learning model, and transmitting the collected monitoring information to a data server.

According to an embodiment, the method may further include transmitting, by the data server to a deep learning model management server, a location and a time at which the performance degradation of the deep learning model had occurred according to the monitoring information.

According to an embodiment, the method may further include collecting, by the deep learning model management server, learning data from probe vehicles traveling at the location at the time, training, by the deep learning model management server, a deep learning model managed by the deep learning model management server based on the learning data, and updating, by the deep learning model management server, the deep learning model provided in the autonomous vehicle by using the trained deep learning model.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, embodiments of the present disclosure are described in detail with reference to the accompanying drawings. In the accompanying drawings, identical or equivalent components are designated by identical reference numerals even when they are displayed in different drawings. Further, where it has been considered that a specific description of related known configurations or functions may cloud the gist of the present disclosure, a detailed description thereof has been omitted.

In describing components of various embodiments of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

Figure 1:
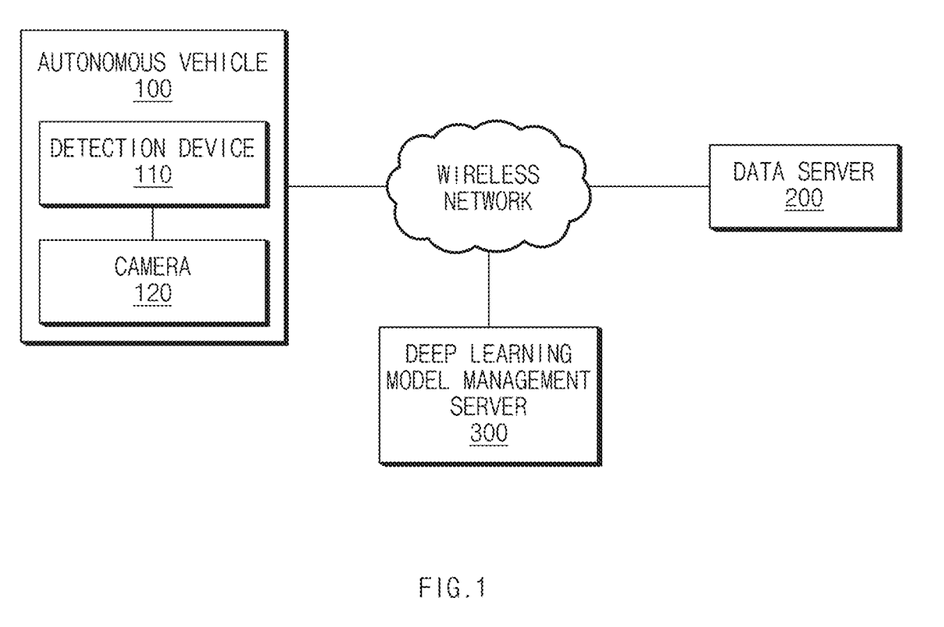
FIG. 1 is a block diagram illustrating a system for improving performance of an autonomous vehicle, according to an embodiment of the present disclosure.

FIG. 1 is a block diagram illustrating a system for improving performance of an autonomous vehicle, according to an embodiment of the present disclosure.

As shown in FIG. 1, the system for improving performance of an autonomous vehicle according to an embodiment of the present disclosure may include an autonomous vehicle 100, a data server 200, and a deep learning model management server 300. In an example, the data server 200 and the deep learning model management server 300 may be integrated into one server.

The autonomous vehicle 100 may include a detection device 110 and a camera 120. the detection device 110 may be configured to determine entropy of each pixel among a plurality of pixels in an output image of a deep learning model used for image recognition in the autonomous vehicle 100, determine an average value of the entropy of the plurality of pixels, and detect performance degradation of the deep learning model based on the average value of the entropy of the plurality of pixels. These and other techniques described herein may allow the detection device 110 to quickly and accurately detect performance degradation of the autonomous vehicle 100 without the need to individually set specific conditions for detecting the performance degradation of the deep learning model. In an example, the detection device 110 may be configured to obtain an output image (e.g., an object recognition image) corresponding to a camera image captured by the camera 120 by inputting the captured camera image to the deep learning model.

In an embodiment, when performance degradation of the deep learning model is detected, the detection device 110 may collect monitoring information corresponding to the camera image input to the deep learning model and may transmit a monitoring message including the collected monitoring information to the data server 200. Monitoring information that may be collected by the detection device 110 according to an example embodiment of the present disclosure is shown below in Table 1.

TABLE 1

| No | Classification | Objective |
|---|---|---|
| 1 | Vehicle type information | Confirm vehicle type in which performance degradation occurs |
| 2 | Time information | Confirm time at which performance degradation occurs |
| 3 | Latitude and longitude | Confirm location at which performance degradation occurs |
| 4 | Deep learning type and version information | Confirm deep learning model type and version |
| 5 | Event camera information | Confirm camera from which camera image is input to deep learning model (confirm event camera when plural cameras are provided) |
| 6 | Additional information (auto light status, rain sensor status, road type) | Confirm auto light condition, rain condition and road type |
| . . . . . . | | . . . |

The data server 200 may be configured to determine the location and time at which the performance degradation of the deep learning model has occurred based on the monitoring message received from the detection device 110. In an example, the data server 200 may accumulate and display the location where the performance degradation of the deep learning model has occurred on a map for each time period so that an administrator can check the location. An example display that may be generated or otherwise provided by the data server 200 is described below with reference to FIG. 2.

Figure 2:
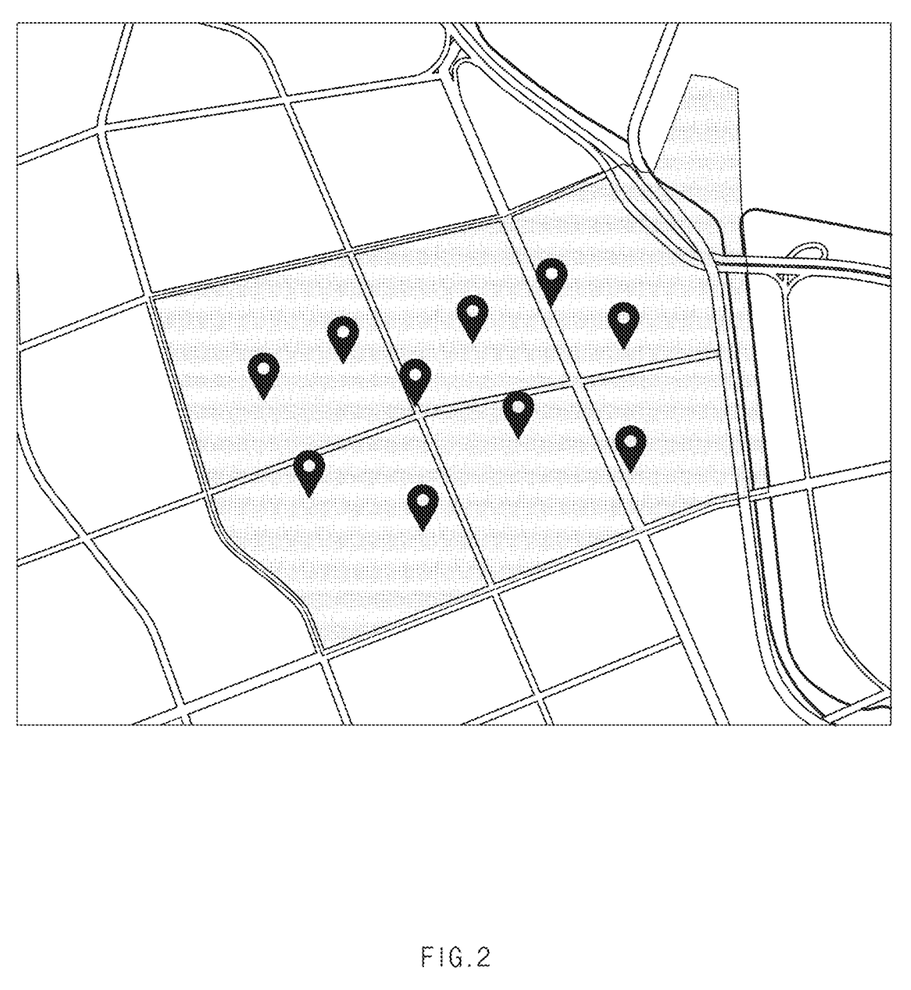
FIG. 2 is a view illustrating a display of locations where performance degradation of a deep learning model in an autonomous vehicle has occurred over time, that may be provided by a data server in a system for improving performance of an autonomous vehicle, according to an embodiment of the present disclosure.

FIG. 2 is a view illustrating a display of locations where performance degradation of a deep learning model has occurred over time, according to an embodiment. The display illustrated in FIG. 2 may be generated or otherwise provided by a data server in a system for improving performance of an autonomous vehicle according to an embodiment of the present disclosure. In an embodiment, the display illustrated in FIG. 2 may be generated or otherwise provided by the data server 200 of FIG. 1.

As shown in FIG. 2, the data server 200 may provide a display of the locations where the performance degradation of the deep learning model has occurred on a map. The locations may be displayed for various time periods, such as 1 month, 3 months, 6 months, 1 year, a period from a first specific day to a second specific date, and the like.

The data server 200 may accumulate the monitoring messages received from the detection device 110 for each month. An example monthly cumulative status display of such monitoring messages, according to an embodiment, is described in more detail below with reference to FIG. 3.

Figure 3:
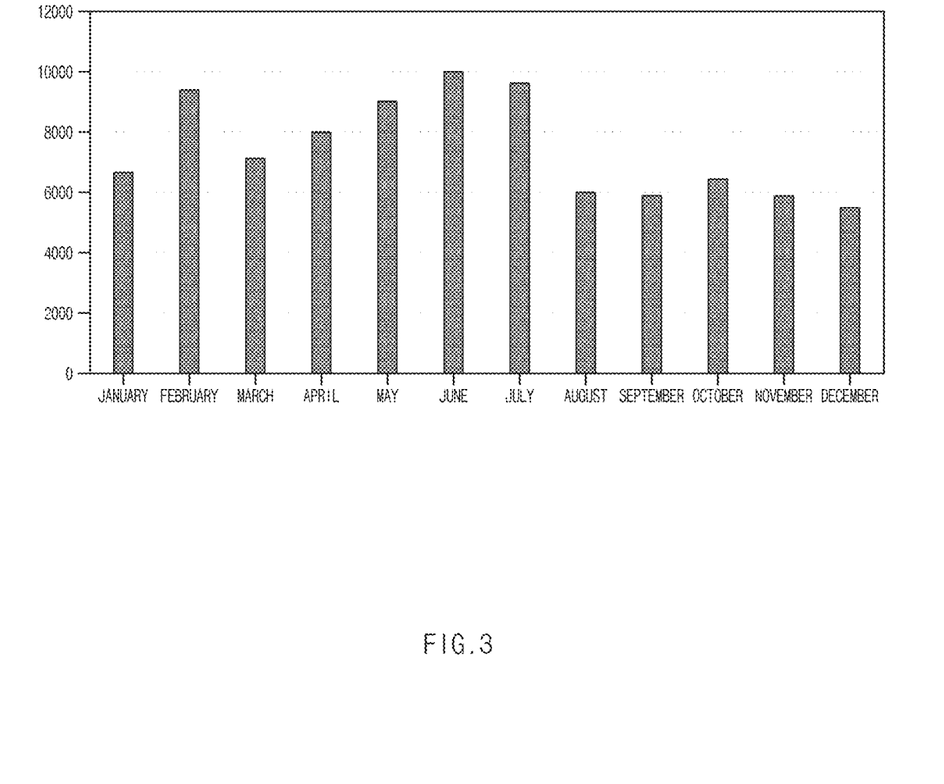
FIG. 3 is a view illustrating monthly cumulative status of monitoring messages generated by a data server provided in a system for improving performance of an autonomous vehicle, according to an embodiment of the present disclosure.

FIG. 3 is a view illustrating monthly cumulative status of monitoring messages generated by a data server provided in a system for improving performance of an autonomous vehicle, according to an embodiment of the present disclosure. In an embodiment, the monthly cumulative status illustrated in FIG. 3 may be generated or otherwise provided by the data server 200 of FIG. 1.

The data server 200 may accumulate monitoring messages received from the detection device 110 and perform statistical processing. Example statistical processing results, according to an embodiment, are shown below in Table 2.

TABLE 2

| No | Zone | Vehicle type | Type and version of deep learning model | Event camera | Auto light | Rain sensor | Road type | Number of roads |
|---|---|---|---|---|---|---|---|---|
| 1 | Samseong-dong | RS4 | DL_MODEL_v1 | WD_CMR_FR | All | All | All | 10,000 |
| 2 | Jamsil-dong | RS4 | DL_MODEL_v1 | WD_CMR_SIDE | All | All | All | 9,000 |
| ...... | ... | ... | ... | ... | ... | ... | ... | ... |

In Table 2, entry No. 1 indicates that the zone is Samseong-dong, the vehicle type is RS4, the type and version of the deep learning model are DL_MODEL_v1, and the event camera is WD_CMR_FR, as a sorting result. Entry No.2 indicates that the zone is Jamsil-dong, the vehicle type is RS4, the type and version of the deep learning model are DL_MODEL_v1, and the event camera is WD_CMR_SIDE, as a sorting result. In this example, the on/off state of the auto light, the detection result of the rain sensor, and the road type are not considered. The sorting may be performed by at least one of the on/off state of the auto light, the detection result of the rain sensor, and the road type, in various embodiments.

The data server 200 may be configured to transmit the statistical processing result to the deep learning model management server 300.

The deep learning model management server 300 may be configured to confirm the location and time at which the performance degradation of the autonomous vehicle 100 has occurred based on the statistical processing result received from the data server 200.

The deep learning model management server 300 may collect learning data from probe vehicles traveling at the location at the time, additionally train the deep learning model managed by the deep learning model management server 300 based on the learning data, and update the deep learning model stored in the autonomous vehicle 100 by transmitting the deep learning model, on which the additional training is completed, to the autonomous vehicle 100.

Figure 4:
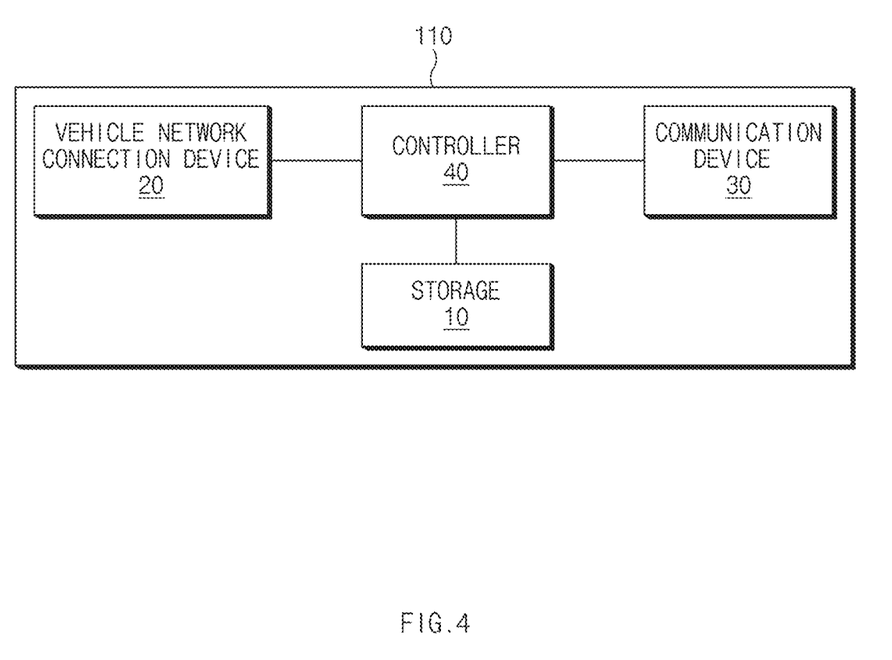
FIG. 4 is a block diagram illustrating an apparatus for detecting performance degradation of an autonomous vehicle, according to an embodiment of the present disclosure.

FIG. 4 is a block diagram illustrating an apparatus for detecting performance degradation of an autonomous vehicle, according to an embodiment of the present disclosure. In an embodiment, the apparatus illustrated in FIG. 4 (sometimes referred to herein as "apparatus 110") corresponds to the detection device 110 of FIG. 1.

As shown in FIG. 4, the apparatus 110 for detecting performance degradation of an autonomous vehicle according to an embodiment of the present disclosure may include a storage 10, a vehicle network connection device 20, a communication device 30, and a controller 40. In various embodiments, depending on a scheme of implementing the apparatus 110 for detecting performance degradation of an autonomous vehicle according to an embodiment of the present disclosure, various components may be combined with each other to be implemented as one, or some components may be omitted.

The storage 10 may store a deep learning model used for image recognition in the autonomous vehicle 100.

The storage 10 may further store various logic, algorithms and programs required in the processes of determining entropy of each pixel among a plurality of pixels in an output image of the deep learning model, determining an average value of the entropy of the plurality of pixels, and detecting performance degradation of the deep learning model based on the average value.

In addition, when the performance degradation of the deep learning model is detected, the storage 10 may further store various logic, algorithms and programs required in the processes of collecting monitoring information corresponding to a camera image input to the deep learning model and transmitting the collected monitoring information to the data server 200.

The storage 10 may include at least one type of a storage medium of memories, such as a flash memory, a hard disk, a micro memory, a memory card (e.g., a secure digital (SD) card or an extreme digital (XD) card), and the like. Additionally, or alternatively, the storage 10 may include one or more of a random access memory (RAM), a static RAM, a read-only memory (ROM), a programmable ROM (PROM), an electrically erasable PROM (EEPROM), a magnetic memory (MRAM), a magnetic disk, and an optical disk type memory.

The vehicle network connection device 20 may be configured to provide a connection interface with a vehicle network. In various embodiments, an internal network of the autonomous vehicle may include a controller area network (CAN), a CAN flexible data-rate (FD), a local interconnect network (LIN), FlexRay, media oriented systems transport (MOST), an Ethernet, and the like.

The communication device 30 may include one or more modules configured to provide communication interfaces to the data server 200 and the deep learning model management server 300. In various embodiments, the communication device 30 may include at least one of a mobile communication module, a wireless Internet module, and a short-range communication module.

The mobile communication module may communicate with the data server 200 and the deep learning model management server 300 via a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), and the like).

The wireless Internet module may include a module for wireless Internet access configured to communicate with the data server 200 and the deep learning model management server 300 via a wireless network, such as a wireless local area network (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication with the data server 200 and the deep learning model management server 300 by using at least one of Bluetooth™, radio frequency identification (RFID), infrared data association (IrDA), ultra-wideband (UWB), ZigBee, near field communication (NFC), and wireless universal serial bus (USB) technology.

The controller 40 may be configured to perform overall control of the components of the apparatus 110 such that each component performs its function. The controller 40 may be implemented in the form of hardware or software or may be implemented in a combination of hardware and software. In an embodiment, the controller 40 may be implemented as a microprocessor, but is not limited thereto.

In various embodiments, the controller 40 may perform various controls required in the processes of determining entropy of each pixel among a plurality of pixels in an output image of a deep learning model, determining an average value of the entropy of the plurality of pixels, and detecting performance degradation of the deep learning model based on the average value.

In an embodiment, when the performance degradation of the deep learning model is detected, the controller 40 may perform various controls required in the processes of collecting monitoring information corresponding to a camera image input to the deep learning model and transmitting the collected monitoring information to the data server 200. Operations of the controller 40, according to some embodiments, are described in more detail below with reference to FIGS. 5 and 6.

Figure 5:
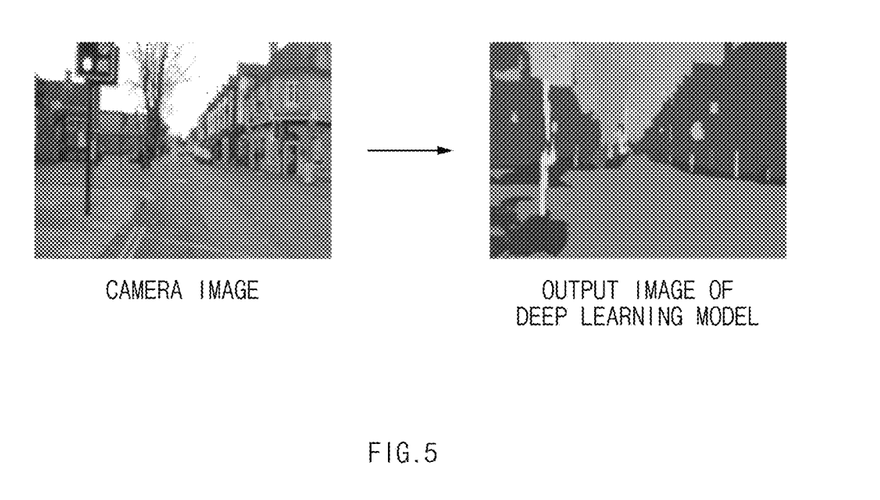
FIG. 5 is a view illustrating an output image of a deep learning model provided in an apparatus for detecting performance degradation of an autonomous vehicle, according to an embodiment of the present disclosure.

FIG. 5 is a view illustrating an output image of a deep learning model provided in an apparatus for detecting performance degradation of an autonomous vehicle, according to an embodiment of the present disclosure.

Referring to FIG. 5, the controller 40 may input a camera image to a deep learning model to obtain an output image of the deep learning model. In an example, the output image of the deep learning model may be an object recognition image.

In the output image of the deep learning model, each class (object) may correspond to a road, a building, a traffic light, a tree, or the like, and it may be understood that each class is expressed with the same shade (or color). For example, pixels classified into the same class are expressed with the same shade (or color).

As described in more detail below, in an embodiment, the pixels in the output image of the deep learning model may be classified as a particular class based on the size of the output image and probability values of the classes. For example, if the dimensions (e.g., in number of pixels) of the output image of the deep learning model is height 100 and width 100, and the number of classes in the output image of the deep learning model is 5, a pixel at coordinates (1, 1) may be recognized as class 5 when, at the coordinates (1, 1) in the output image of the deep learning model, the probability value of class 1 is 0.1, the probability value of class 2 is 0.1, the probability value of class 3 is 0, and the probability value of class 4 is 0, and the probability value of class 5 is 0.8.

In an example, the output image of the deep learning model may include class information for each pixel. Continuing with the above example, as information about coordinates (1, 1), the output image of the deep learning model may include the probability value of class 1 of 0.1, the probability value of class 2 of 0.1, the probability value of class 3 of 0 (zero), the probability values of class 4 of 0 (zero), and the probability value of class 5 of 0.8.

Figure 6:
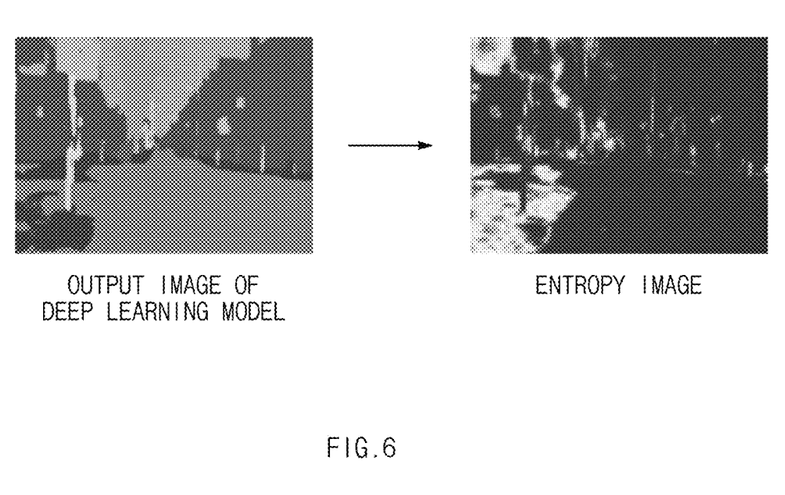
FIG. 6 is a view illustrating a process in which a controller provided in an apparatus for detecting performance degradation of an autonomous vehicle determines the entropy of each pixel among a plurality of pixels in an output image of a deep learning model, according to an embodiment of the present disclosure.

FIG. 6 is a view illustrating a process in which a controller provided in an apparatus for detecting performance degradation of an autonomous vehicle, according to an embodiment of the present disclosure, determines the entropy of each pixel by using an output image of a deep learning model.

As shown in FIG. 6, the controller 40 may generate an entropy image from the output image of the deep learning model. In an example, the controller 40 may determine entropy ($E^{(h,w)}$) of (h, w)-th pixel in the output image of the deep learning model based on following Equation 1.

$$E^{(h,w)} = \sum_{c=1}^{c} p^{(h,w)}(c)\log(p^{(h,w)}(c)) \quad \text{[Equation 1]}$$

In Equation 1, 'h' represents the height coordinate of the (h, w)-th pixel in the output image of the deep learning model, 'w' represents the width coordinate of the (h, w)-pixel in the output image of the deep learning model, and 'c' represents the number of classes included in the output image of the deep learning model. In addition, 'p' represents a probability value, and $p^{(h,w)}$ represents a probability value of the (h, w)-th pixel.

The controller 40 may determine the entropy of each pixel in the output image of the deep learning model based on Equation 1 and may determine an average value of the entropy of the pixels. For example, if pixels are A, B and C, the entropy of A is 0.3, the entropy of B is 0.5, and the entropy of C is 0.1, the controller 40 may determine the average value of the entropy of each pixel as 0.3.

When the average value (Average_E) of the entropy of each pixel is within a reference range (E_lower_limit<Average_E<E_upper_limit), the controller 40 may determine that the performance degradation of the deep learning model has occurred. In an example, 'E_lower_limit' and 'E_upper_limit' may be determined to indicate that the performance of the deep learning model is stable when the average value is less than or equal to 'E_lower_limit', and that the autonomous vehicle 100 is not in a driving state when the average value is greater than or equal to 'E_upper_limit'.

When it is determined that the performance degradation of the deep learning model has occurred, the controller 40 may collect, from the vehicle network, monitoring information corresponding to the camera image input to the deep learning model, and may transmit a monitoring message including the monitoring information to the data server 200.

Figure 7:
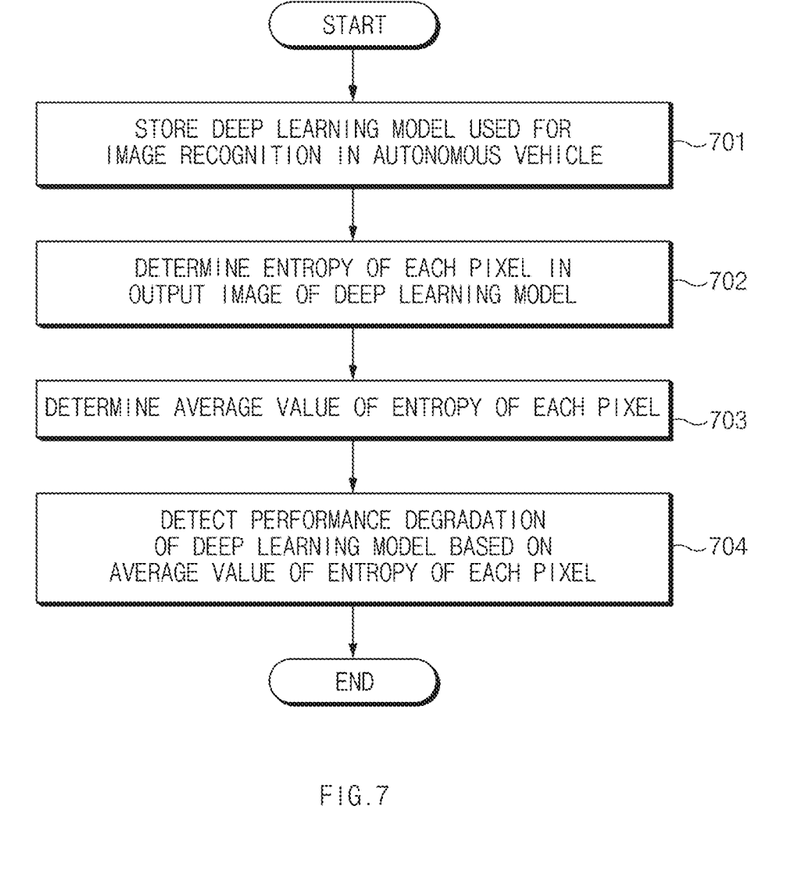
FIG. 7 is a flowchart illustrating a method for detecting performance degradation of an autonomous vehicle, according to an embodiment of the present disclosure.

FIG. 7 is a flowchart illustrating a method for detecting performance degradation of an autonomous vehicle, according to an embodiment of the present disclosure.

In block or operation 701, a deep learning model used for image recognition in the autonomous vehicle may be stored in the storage 10.

In block or operation 702, the controller 40 may determine the entropy of each pixel among a plurality of pixels in an output image of the deep learning model.

In block or operation 703, the controller 40 may determine the average value of the entropy of the plurality of pixels.

In block or operation 704, the controller 40 may detect performance degradation of the deep learning model based on the average value of the entropy of the plurality of pixels.

Figure 8:
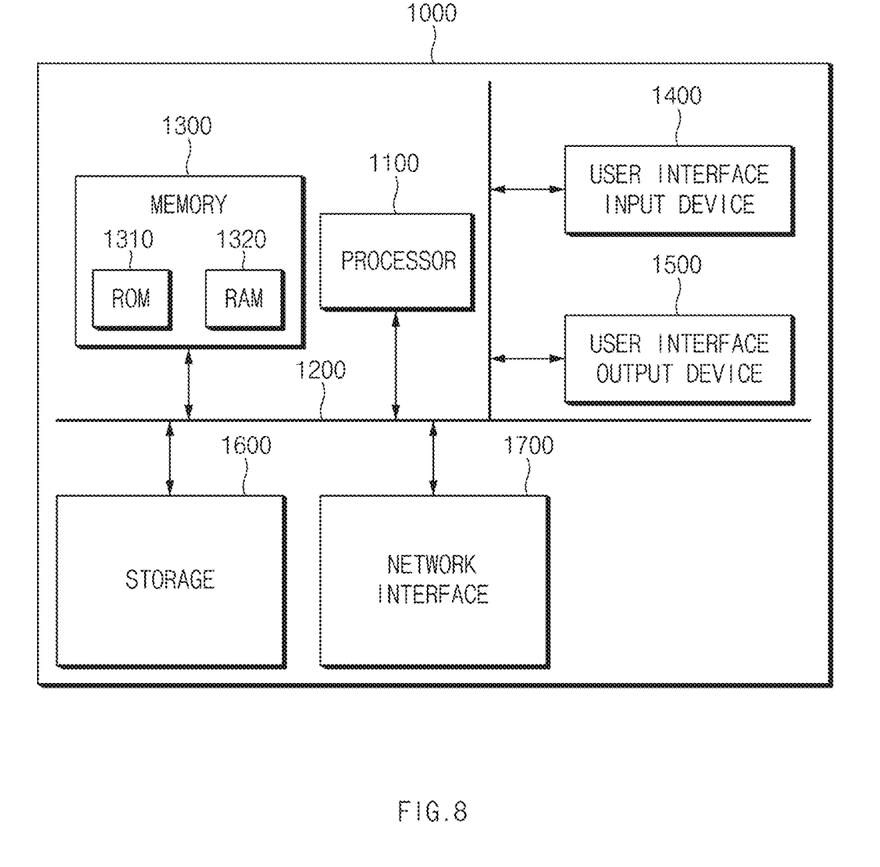
FIG. 8 is a block diagram illustrating a computing system for executing a method of detecting performance degradation of an autonomous vehicle, according to an embodiment of the present disclosure.

FIG. 8 is a block diagram illustrating a computing system for executing a method of detecting performance degradation of an autonomous vehicle according to an embodiment of the present disclosure.

Referring to FIG. 8, a method of detecting performance degradation of an autonomous vehicle according to an embodiment of the present disclosure described above may be implemented in a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that executes instructions stored in the memory 1300 and/or the storage 1600. The memory 1300 and the storage 1600 may include various types of volatile or non-volatile storage media. For example, the memory 1300 may include a Read Only Memory (ROM) 1310 and/or a Random Access Memory (RAM) 1320.

In various embodiments, the processes of the method or algorithm described in relation to the embodiments of the present disclosure may be implemented directly by hardware executed by the processor 1100, a software module, or a combination thereof. The software module may reside in a storage medium (e.g., the memory 1300 and/or the storage 1600), such as a RAM, a flash memory, a ROM, an EPROM, an EEPROM, a register, a hard disk, solid state drive (SSD), a detachable disk, or a CD-ROM. The storage medium may be coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another embodiment, the processor 1100 and the storage medium may reside in the user terminal as separate components.

As described above, the apparatus and method for detecting performance degradation of an autonomous vehicle according to embodiments of the present disclosure may quickly and accurately detect performance degradation of an autonomous vehicle without the need to individually set specific conditions for detecting the performance degradation of a deep learning model utilized in the autonomous vehicle. In embodiments, the quick and accurate detection of performance degradation may be achieved by determining entropy of each pixel among a plurality of pixels in an output image of a deep learning model used for image recognition in the autonomous vehicle, determining an average value of the entropy of the plurality of pixels, and detecting performance degradation of the deep learning model based on the average value of the entropy of the plurality of pixels.

In addition, the apparatus and method for detecting performance degradation of an autonomous vehicle according to embodiments of the present disclosure may confirm the location and time at which the performance degradation of the deep learning model have occurred by collecting monitoring information corresponding to a camera image input to the deep learning model and transmitting the collected monitoring information to a data server. In aspects, the deep learning model may be further trained based on learning data obtained at the location at the time, thereby improving the performance of the deep learning model.

Although example embodiments of the present disclosure have been described for illustrative purposes, those having ordinary skill in the art should appreciate that various modifications, additions and substitutions are possible, without departing from the scope and spirit of the disclosure.

Therefore, the embodiments disclosed in the present disclosure are provided for the sake of descriptions, and it should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for detecting performance degradation of an autonomous vehicle, the apparatus comprising:
   a storage configured to store a deep learning model used for image recognition in the autonomous vehicle; and
   a controller configured to
      determine entropy of each pixel among a plurality of pixels in an output image of the deep learning model,
      determine an average value of the entropy of the plurality of pixels, and
      detect performance degradation of the deep learning model based on the average value of the entropy of the plurality of pixels, and
      transmit monitoring information to at least one of external servers, wherein the monitoring information includes a location and a time at which the performance degradation of the deep learning model has occurred.

2. The apparatus of claim 1, wherein the controller is configured to detect the performance degradation of the deep learning model when the average value of the entropy of the plurality of pixels is within a reference range.

3. The apparatus of claim 1, wherein the controller is configured to, when the performance degradation of the deep learning model is detected:
   collect the monitoring information corresponding to a camera image input to the deep learning model; and
   transmit the monitoring information to a data server of the external servers.

4. The apparatus of claim 3, wherein the monitoring information includes at least one of vehicle model information, time information, latitude information, longitude information, deep learning model type information, deep learning model version information, event camera information, auto light status information, rain sensor status information, or road type, or a combination thereof.

5. The apparatus of claim 3, wherein the data server is configured to transmit, to a deep learning model management server of the external servers, the location and the time at which the performance degradation of the deep learning model has occurred according to the monitoring information.

6. The apparatus of claim 5, wherein the deep learning model management server is configured to
   collect learning data from probe vehicles traveling at the location at the time,
   train a deep learning model managed by the deep learning model management server based on the learning data, and
   update the deep learning model provided in the autonomous vehicle by using the trained deep learning model.

7. The apparatus of claim 1, wherein the controller is configured to determine the entropy of each pixel among the plurality of pixels in the output image of the deep learning model based on:

$$E^{(h,w)} = \sum_{c=1}^{c} p^{(h,w)}(c) \log(p^{(h,w)}(c))$$

where (E(h,w)) represents the entropy of an (h, w)-th pixel, h represents height pixel coordinate in the output image of the deep learning model, w represents width pixel coordinate in the output image of the deep learning model, c represents a number of classes included in the output image of the deep learning model, and p (h,w) represents a probability value of the (h, w)-th pixel.

8. A method of detecting performance degradation of an autonomous vehicle, the method comprising:
  determining, by a controller, entropy of each pixel among a plurality of pixels in an output image of a deep learning model for image recognition in the autonomous vehicle, wherein the deep learning model is stored in a storage,
  determining, by the controller, an average value of the entropy of the plurality of pixels,
  detecting, by the controller, performance degradation of the deep learning model based on the average value of the entropy of the plurality of pixels, and
  transmitting, by the controller, monitoring information to at least one of external servers, wherein the monitoring information includes a location and a time at which the performance degradation of the deep learning model has occurred.

9. The method of claim 8, wherein detecting the performance degradation of the deep learning model includes detecting the performance degradation of the deep learning model when the average value of the entropy of each pixel is within a reference range.

10. The method of claim 8, further comprising:
  collecting the monitoring information corresponding to a camera image input to the deep learning model when the performance degradation of the deep learning model is detected, and
  transmitting the monitoring information to a data server of the external servers.

11. The method of claim 10, wherein the monitoring information includes at least one of vehicle model information, time information, latitude information, longitude information, deep learning model type information, deep learning model version information, event camera information, auto light status information, rain sensor status information, or road type, or a combination thereof.

12. The method of claim 10, further comprising transmitting, by the data server to a deep learning model management server of the external servers, the location and the time at which the performance degradation of the deep learning model has occurred according to the monitoring information.

13. The method of claim 12, further comprising:
  collecting, by the deep learning model management server, learning data from probe vehicles traveling at the location at the time;
  learning, by the deep learning model management server, a deep learning model managed by the deep learning model management server based on the learning data; and
  updating, by the deep learning model management server, the deep learning model provided in the autonomous vehicle by using the learned deep learning model.

14. The method of claim 8, wherein the determining of the entropy of each pixel in the output image of the deep learning model includes determining the entropy of each pixel in the output image of the deep learning model based on $$E^{(h,w)} = \sum_{c=1}^{c} p^{(h,w)}(c)\log(p^{(h,w)}(c))$$

where (E(h,w)) represents the entropy of an (h, w)-th pixel, h represents height pixel coordinate in the output image of the deep learning model, w represents width pixel coordinate in the output image of the deep learning model, c represents a number of classes included in the output image of the deep learning model, and p (h,w) represents a probability value of the (h, w)-th pixel.

* * * * *